(12) United States Patent
Yang et al.

(10) Patent No.: US 7,708,407 B2
(45) Date of Patent: May 4, 2010

(54) EYE TRACKING COMPENSATED METHOD AND DEVICE THEREOF

(75) Inventors: Fu-Chi Yang, Tainan (TW); Chia-Hang Lee, Tainan (TW); Cheng-Yi Chen, Tainan (TW); I-Lin Ho, Tainan (TW)

(73) Assignee: Chi Mei Optoelectronics Corp. (TW)

( * ) Notice: Subject to any disclaimer, the term of this patent is extended or adjusted under 35 U.S.C. 154(b) by 295 days.

(21) Appl. No.: 11/818,414

(22) Filed: Jun. 14, 2007

(65) Prior Publication Data

US 2007/0291227 A1 Dec. 20, 2007

(30) Foreign Application Priority Data

Jun. 15, 2006 (TW) .............................. 95121350 A

(51) Int. Cl.
*A61B 3/14* (2006.01)
*G09G 5/00* (2006.01)

(52) U.S. Cl. ..................... 351/209; 345/104; 345/581

(58) Field of Classification Search ................. 351/209, 351/210; 345/104, 581
See application file for complete search history.

(56) References Cited

U.S. PATENT DOCUMENTS

| | | | | |
|---|---|---|---|---|
| 2005/0068465 | A1* | 3/2005 | Van Dijk | 348/699 |
| 2006/0280249 | A1* | 12/2006 | Poon | 375/240.16 |
| 2007/0018934 | A1* | 1/2007 | Kim et al. | 345/98 |
| 2008/0204393 | A1* | 8/2008 | Ben-David | 345/98 |
| 2008/0238847 | A1* | 10/2008 | Aiba et al. | 345/87 |
| 2009/0135913 | A1* | 5/2009 | Nair et al. | 375/240.16 |

* cited by examiner

*Primary Examiner*—Jordan M. Schwartz
(74) *Attorney, Agent, or Firm*—Trop Pruner & Hu, P.C.

(57) ABSTRACT

Motion blur associated with hold-type display devices may be reduced by eye tracking compensation. Eye tracking compensation may depend on the magnitude and direction of a motion vector, which may be used to generate a human-vision image compensation signal. An original input image signal and the human-vision image compensation signal may be used to generate and output a compensated image signal. As a result, motion blur arising from eye tracking characteristics is reduced.

16 Claims, 8 Drawing Sheets

EYE TRACKING COMPENSATED METHOD AND DEVICE THEREOF

CROSS REFERENCE TO RELATED APPLICATION

This claims priority under 35 U.S.C. §119 of Taiwan Application No. 095121350, filed Jun. 15, 2006, which is hereby incorporated by reference.

TECHNICAL FIELD

The present invention relates to compensating for motion blur such as motion blur caused by eye tracking characteristics.

BACKGROUND

Because of advances made in liquid crystal display (LCD) technology, there is a recent trend of substituting liquid crystal displays for conventional cathode ray tube displays. As the trend occurs with monitors and televisions, it affects both the computer and entertainment markets. Liquid crystal displays, however, may exhibit motion blur in moving images displayed on the LCD. Motion blur may be a problem for various reasons, such as liquid crystal response speeds, methods of device driving, light sources for the displays, and eye tracking characteristics.

There are cause-specific approaches to reduce motion blur that might otherwise be found in moving images, such as by using high-speed liquid crystal materials, liquid crystal overdrive techniques, or scanning backlights. Nevertheless, motion blur caused by eye tracking characteristics remains unsolved due at least in part to the hold-type nature of liquid crystal displays.

Eye tracking characteristics refers to low-pass filtering that is typical of a human being tracking a moving target. In other words, a human being tracking a moving target performs a mathematical integration of the locus of the moving target to maintain image continuity. Before performing the mathematical integration, however, the locus weight of the moving target is multiplied by luminance.

FIG. 1 illustrates 100 motion blur of a moving target 110 that is caused by human eye tracking characteristics. The vertical axis on the left of the figure represents location in pixels; the horizontal axis represents time in halves of one frame period; the moving target 110 has the white pixel value denoted by 1 and the background has the pixel value of 0. In this example, the moving target 110 moves downward at a unit speed of 1/60 second (e.g., one frame period). Owing to eye tracking characteristics, the human eye perceives an image in the first region 120 and second region 130 to bear values ranging from 0 to 1, as opposed to the default background pixel value, which results in the motion blur depicted in FIG. 2.

FIG. 3 illustrates the effect of eye tracking characteristics on a user's perception of an image. For example, an input signal 310 is received by a liquid crystal display 320 and is subjected to mathematical integration by an eye tracking characteristic model 330 before being turned into a user's perceived image 340. Although the input signal 310 may be restored by the liquid crystal display 320, the user's perceived image 340 may still not be free from motion blur. Hence, there is a continuing need for ways to cope with motion blur caused by eye tracking characteristics.

BRIEF DESCRIPTION OF THE DRAWINGS

FIGS. 6-1 to 6-5 illustrate various embodiments of filters for eye tracking compensation.

DETAILED DESCRIPTION

According to an embodiment of the present invention, motion blur caused by eye tracking characteristics may be reduced by adjusting pixel values of an input image signal. For example, an input image signal may be received and a motion vector may be generated according to the received input image signal. A weight according to the motion vector may also be generated. An output image signal may be generated by adjusting the pixel values of the input image according to the weight.

Figure 4:
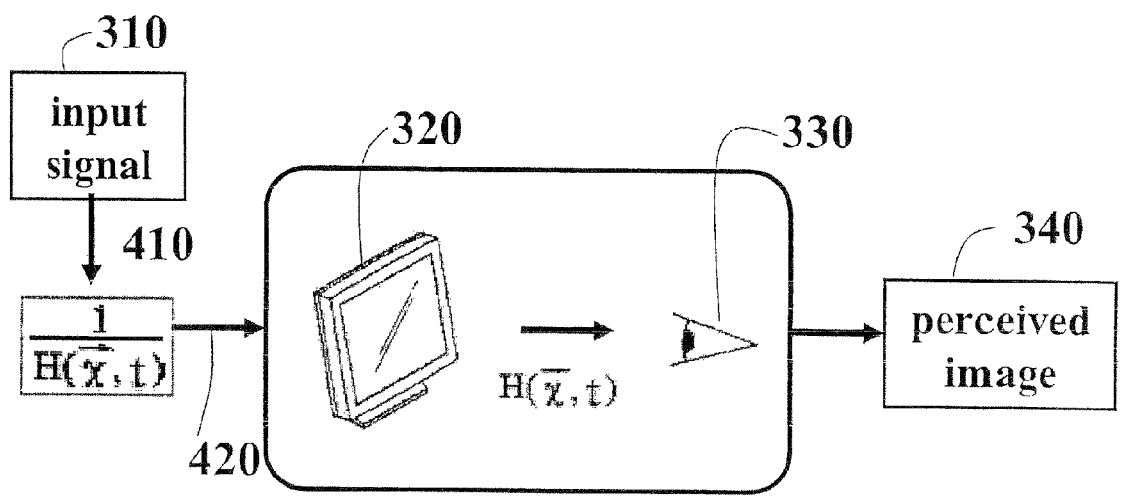
FIG. 4 illustrates compensation for eye tracking characteristics according to an embodiment.

Referring to FIG. 4, in an embodiment, an input signal 310 is processed by an eye tracking compensated computation block 410 to obtain an output image 420 having reduced motion blur. Thereafter, the image 420 is sent to the liquid crystal display 320 to be displayed. For instance, an input signal S may be processed by a compensating unit to generate a compensated signal S*(1/H(x,t)), where H(x,t) is the function simulating a viewer's visual perceptual reaction to an image displayed on a liquid crystal display, using an eye tracking characteristic model. The viewer perceives the compensated signal S*(1/H(x,t)) received by and displayed on the liquid crystal display to be S*(1/H(x,t))* H(x,t) approximately, indicating reduced motion blur.

Figure 5:
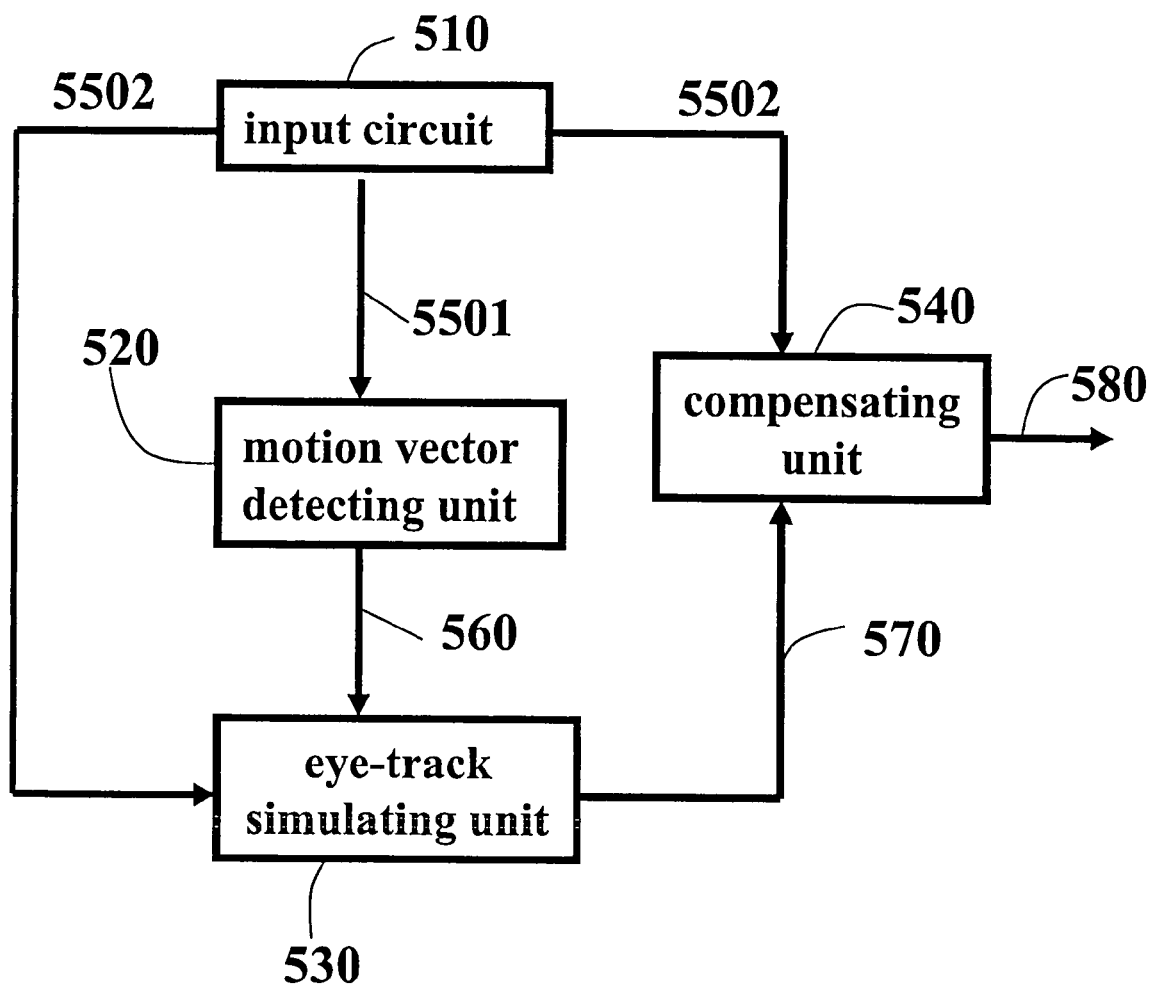
FIG. 5 is a block diagram of an embodiment of a circuit for eye tracking compensation.

FIG. 5 illustrates an exemplary eye tracking compensated system 500. The system 500 includes an input circuit 510, a motion vector detecting unit 520, an eye-track simulating unit 530, and a compensating unit 540. The input circuit 510 receives and buffers an input image signal that includes a first frame image signal and a second frame image signal. The second frame image signal is received before the first frame image signal and is buffered by a register (not shown). The input circuit 510 sends a relay image signal 5501 to the motion vector detecting unit 520 and a first frame image signal 5502 to the eye-track simulating unit 530 and the compensating unit 540. The relay image signal 5501 comprises the first frame image signal and the second frame image signal. The motion vector detecting unit 520 generates a motion vector 560 according to the relay image signal 5501. An image moves in the direction of the motion vector 560 at a velocity equivalent to the magnitude of the motion vector 560. A weight is determined according to the motion vector 560. A compensation signal 570 is generated according to the weight and is sent to the compensating unit 540. The compensating unit 540 generates a compensated signal 580 according to the first frame image signal 5502 and the compensation signal 570 and sends the compensated signal 580 to a display device, such as a liquid crystal display (not shown), for display.

To better understand an eye tracking compensated system such as system 500, reference is first made to (FIG. 6-1) a schematic showing an input image signal without eye tracking compensation and another schematic showing the result of visual perception of the uncompensated input image signal. Referring to the upper drawing of FIG. 6-1, the horizontal axis represents pixel space (in pixels), the vertical axis represents time (in fourths of one frame period), and 1 and 0 define the range of pixel luminance. In this example, an object having a pixel value of 1 is displaced rightward from frame 1 to frame 2, at a velocity of 4 pixels/frame (equivalent to the magnitude of the motion vector). Referring to the lower drawing of FIG. 6-1, a human viewing the above-referenced displaced object on a liquid crystal display will perceive a blurring of the moving object. For example, the horizontal axis represents pixels (in pixels), and the vertical axis represents luminance of image perceived by the human eye. The line segments parallel to the horizontal axis indicate a perceived luminance of 0 and 1 (left and right line segments respectively). The line segment diagonal to the horizontal indicates that the human eye perceives a blur region lying between the region of luminance 0 and the other region of luminance 1, which has luminance between 0 and 1.

Figure 1:
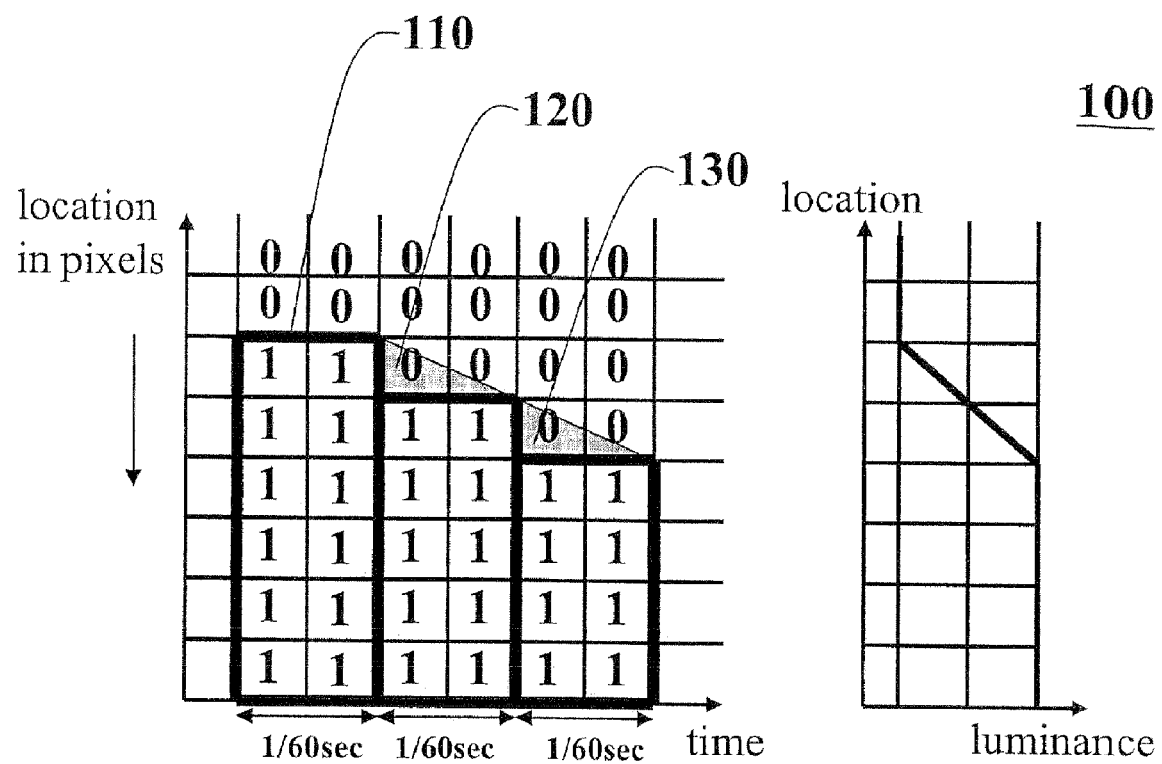
FIG. 1 illustrates uncompensated motion blur caused by eye tracking characteristics.
Figure 2:
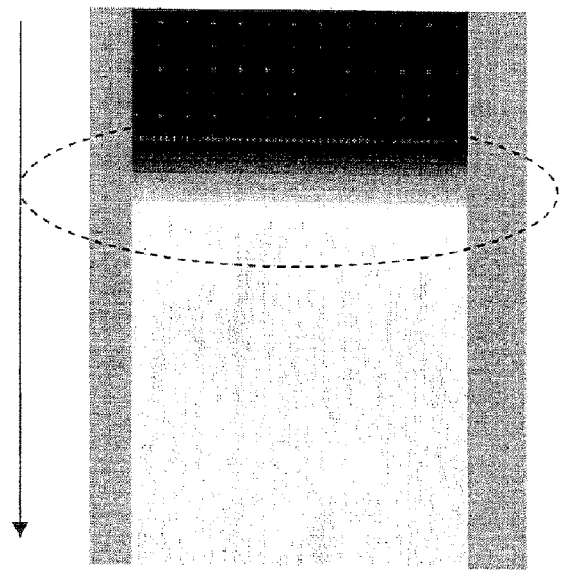
FIG. 2 is a schematic view showing the motion blur of FIG. 1.
Figures 1, 6:
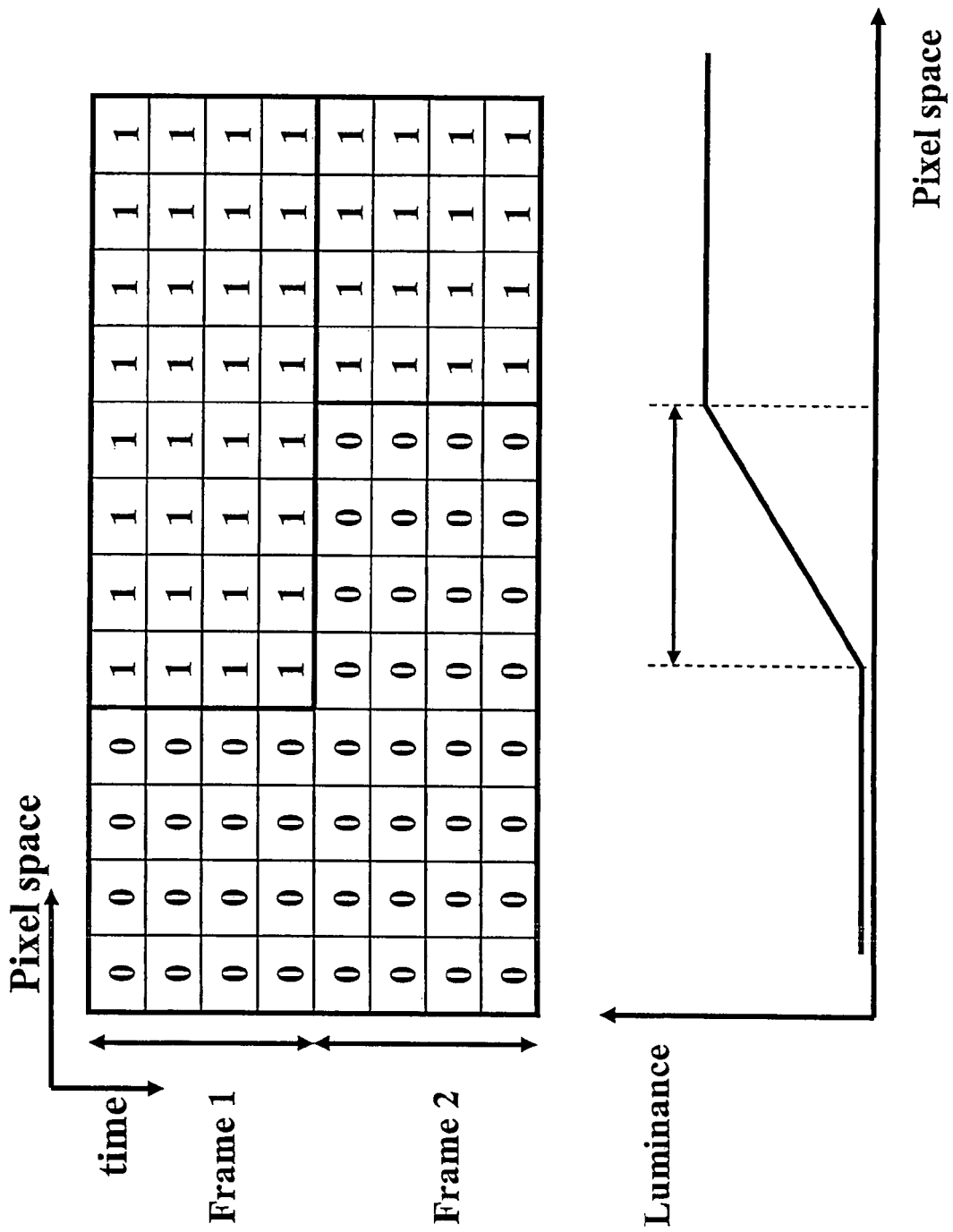
Figures 2, 6:
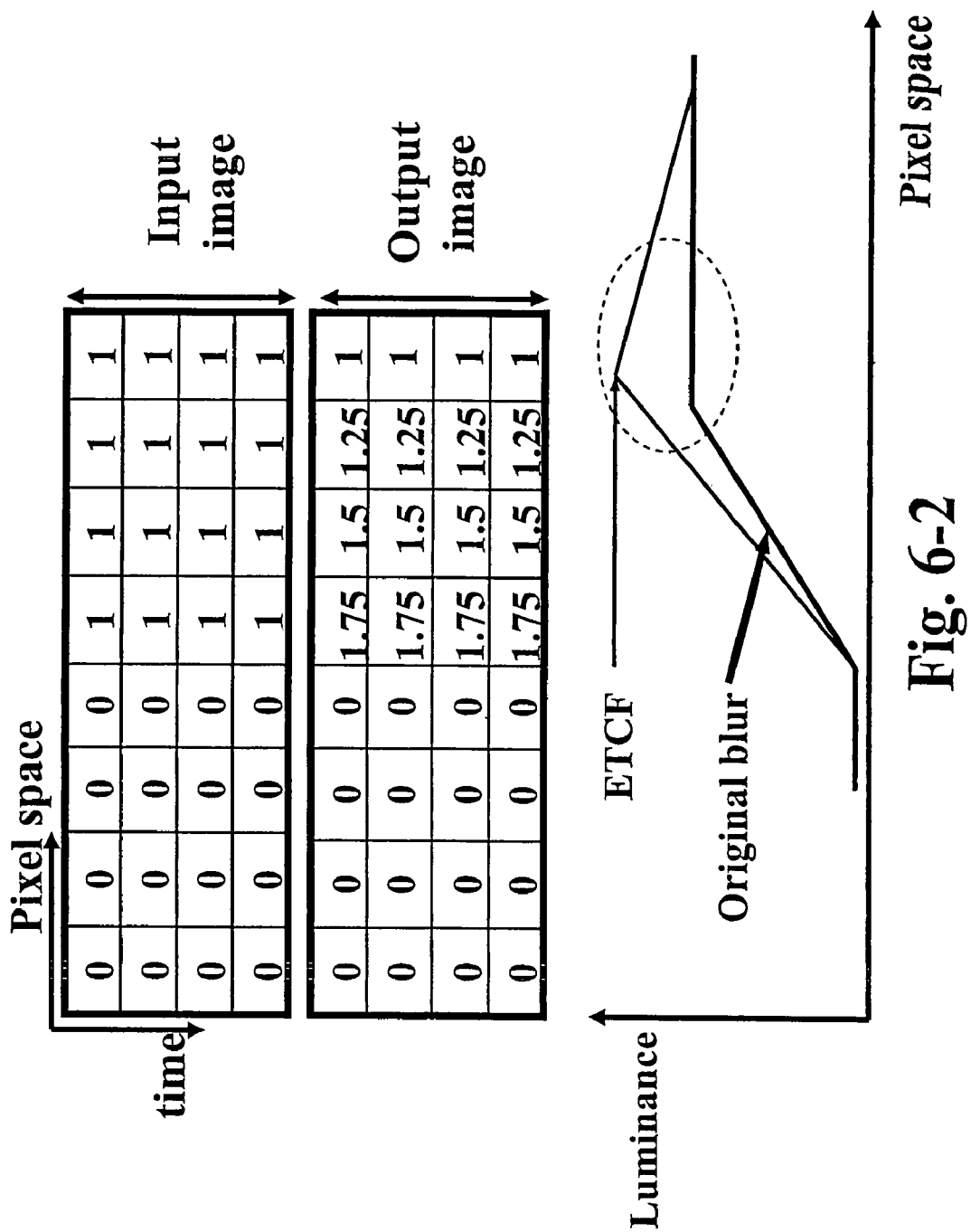
Figures 3, 6:
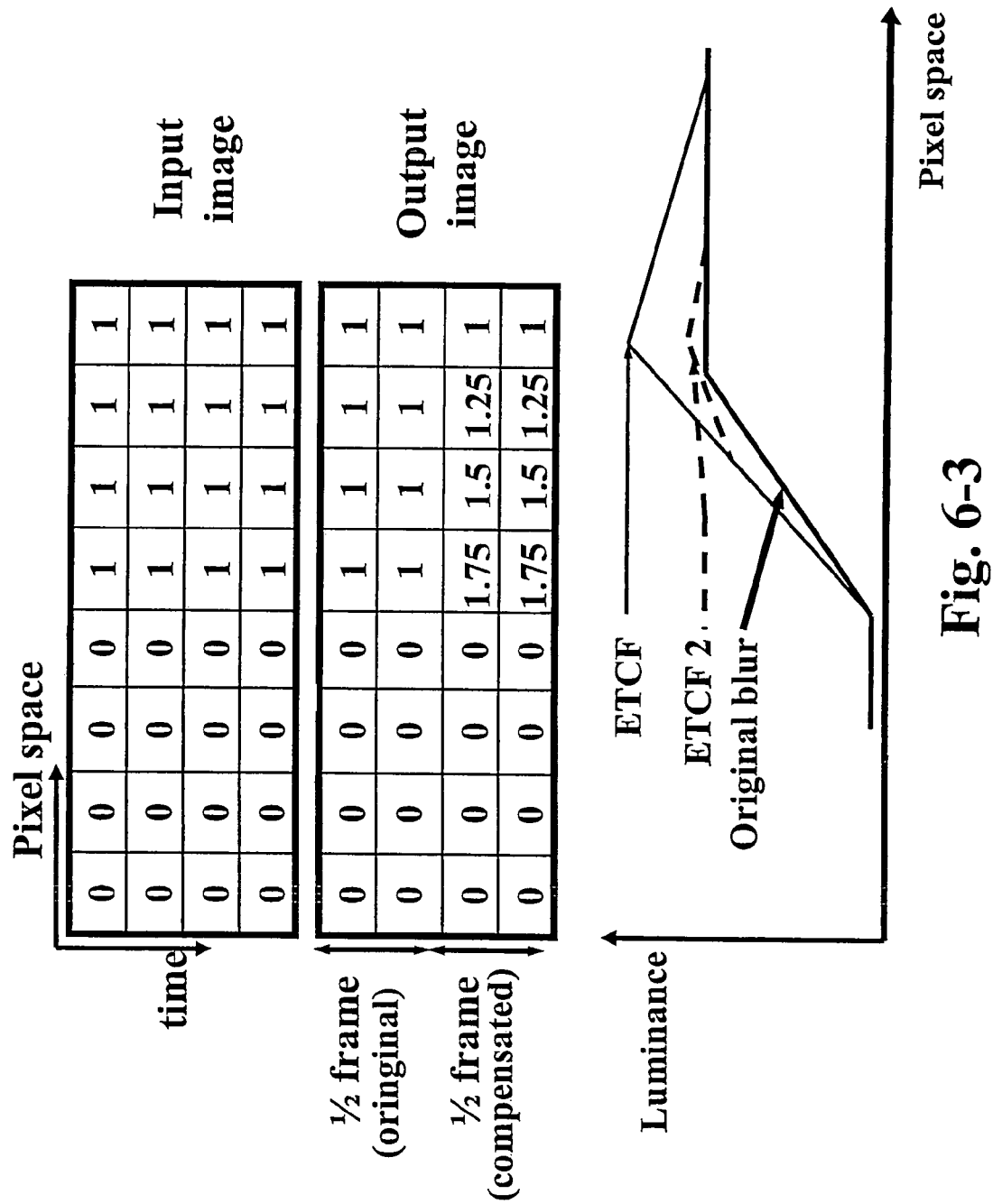
Figures 4, 6:
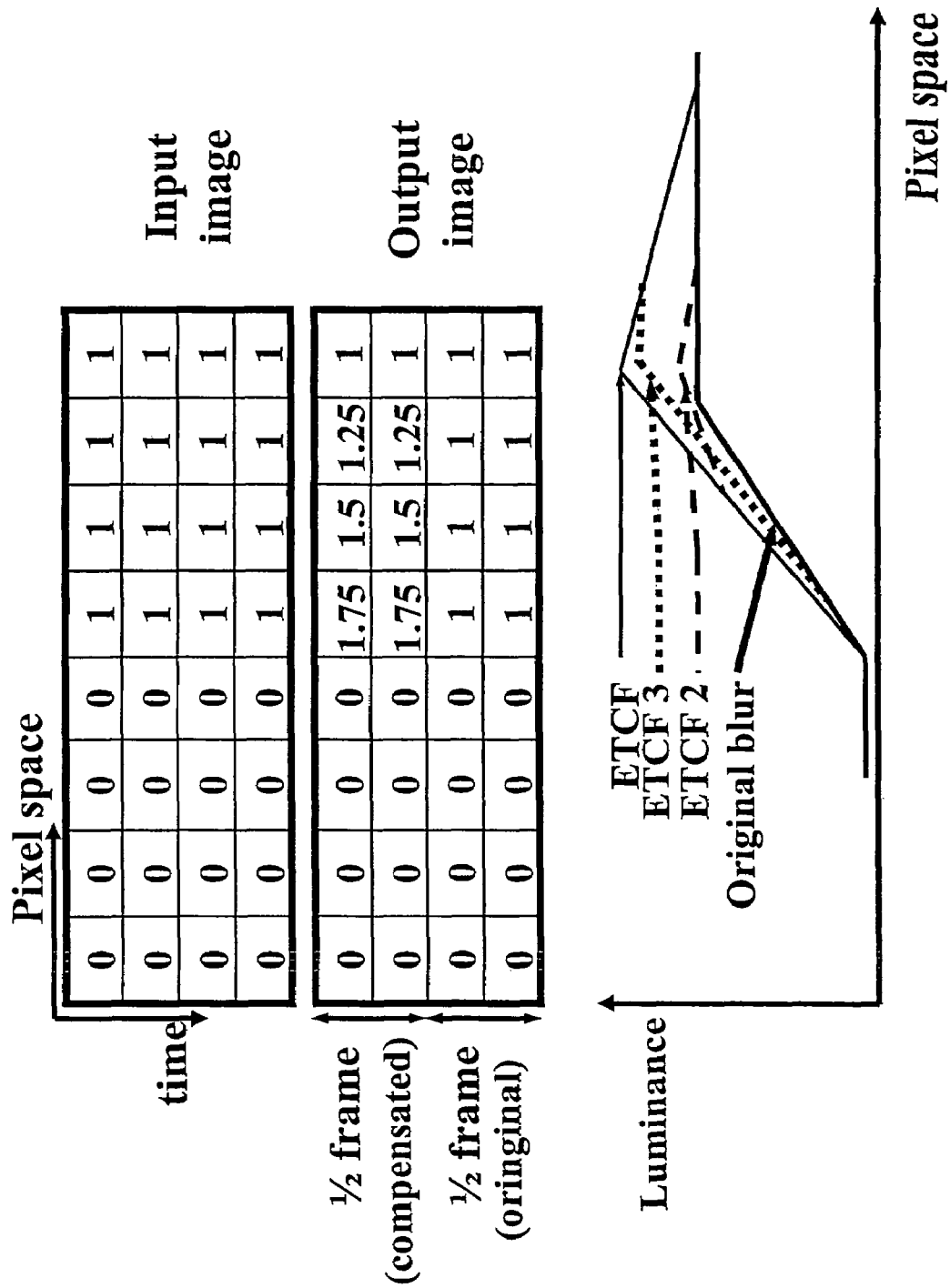
Figures 5, 6:
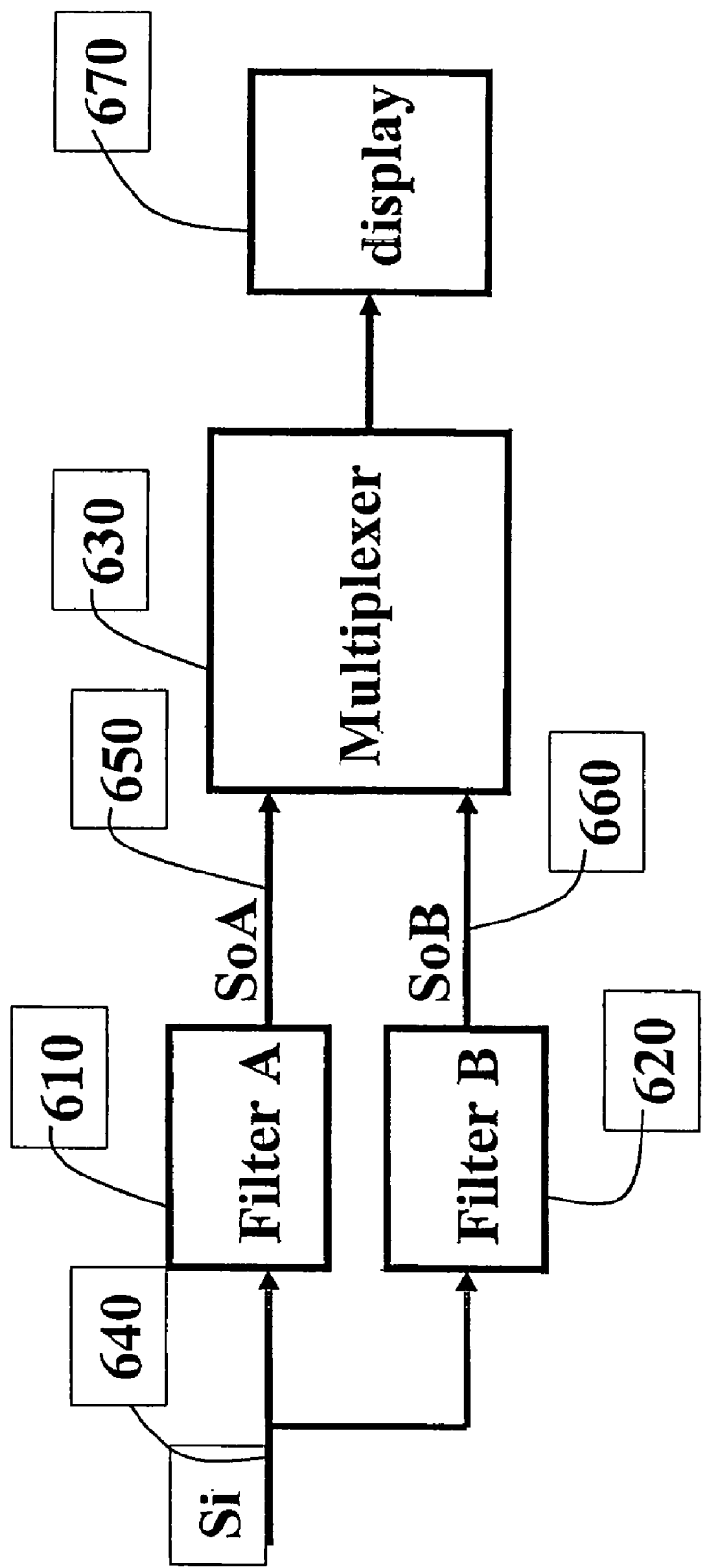

FIG. 6-2 is another schematic. This schematic however shows eye tracking compensation according to an embodiment of the present invention. Generally, a motion vector is generated, such as the motion vector of FIG. 6-1, which moves rightward in frames 1 and 2 at a speed of 4 pixels/frame. The motion vector is used to generate a compensated signal, which is substituted for the frame that would have resulted (e.g., frame 2 of FIG. 6-1) but for the compensation.

The upper drawing in FIG. 6-2 shows luminance of pixels for the original input image, which in this example is tantamount to frame 2 of the upper drawing in FIG. 6-1, whereas the middle drawing in FIG. 6-2 shows a compensated image for replacing the original input image. In an embodiment, the compensated image is obtained by an eye tracking compensated filter (ETCF). In this example, the relationship between the compensated image signal and the original image signal is:

$$So(n)=Si(n)+\{Si(n)-[Si(n)+Si(n-1)+Si(n-2)+Si(n-3)]/4\}$$

$Si(n)$ denotes luminance of pixels for the original input image signal, where n, an integer, denotes pixel location.

$So(n)$ denotes luminance of pixels for the output image signal derived from the original image signal $Si(n)$ processed by the eye tracking compensated filter (ETCF), where n, an integer, denotes pixel location.

$Si(n-1)$, $Si(n-2)$, and $Si(n-3)$ denote luminance of pixels for resultant image signals resulting from displacement of $Si(n)$ to the right by a distance of one, two, and three pixels respectively.

Notably, the expression $[Si(n)+Si(n-1)+Si(n-2)+Si(n-3)]/4$ used in the relation between the output image signal $So(n)$ and the original image signal $Si(n)$ expresses the average of the original image signal $Si(n)$ and the resultant image signals $Si(n-1)$, $Si(n-2)$, and $Si(n-3)$ resulting from displacement of the original image signal $Si(n)$ in the same direction as the motion vector (rightward in this example).

Although an example is given with pixels aligned in one dimension, embodiments can be applied to a matrix of pixels aligned in two dimensions as well.

The compensated image signal So depends on the magnitude and direction of the motion vector. For instance, the relationship between the compensated image signal So and the original input image signal Si is as follows:

$$So=Si+\{Si-[(Si+Si1+Si2+\ldots+Si(k-1))/k]\},$$

where k denotes a positive integer that is greater than 2 and that positively correlates with the magnitude of the motion vector. For example, if the magnitude of the motion vector is 4 pixels per frame, then k is 4. Furthermore, the expression $Si1, Si2 \ldots, Si(k-1)$ refers to the resultant image signals resulting from different amounts of displacement of the image signal Si in the same direction as the motion vector. As one example, if the direction of the motion vector is to the right and the original image signal Si is displaced rightward by a distance of one, two, and three pixels, then the expression $Si1$, $Si2$, and $Si3$ refers to $Si(n-1)$, $Si(n-2)$, and $Si(n-3)$ respectively and denotes luminance of pixels for resultant image signals resulting from the displacement of the image signal $Si(n)$ to the right by a distance of one, two, and three pixels respectively.

The average of the first frame image signal Si and the resultant image signals that result from the displacement of the first frame image Si in a direction parallel to or the same as the motion vector can be denoted by the term Sc. Thus, the compensated image signal So may be defined as So=Si+(Si−Sc).

The graph shown in the lower drawing of FIG. 6-2 is a plot of luminance on the vertical axis against pixel space (in pixels) on the horizontal axis. Generally, the graph shows the original blurred image from the lower drawing of FIG. 6-1 and the output compensated image (ETCF). The effect of an ETCF on human vision may be a reduction of image blur in the presence of a relatively great luminance. For example, referring to the graph, the ETCF has a faster increase in luminance and a reduced motion blur as compared to the original image. There is, however, some overshooting, which is indicated by the dotted line. Although in this example the moving object looks brighter than the background, in other instances a moving object may look darker than the background, which would result in an undershooting.

In some embodiments, the compensated signal So may be displayed over the entire frame period. But in other embodiments, the compensated signal So may be displayed over a portion of a frame period. For example, referring to the upper and middle drawings of FIG. 6-3, the original input image Si may be displayed over the first half of the frame period and the compensated image So may be displayed over the second half of the frame period. The compensated image So in this embodiment also results from eye tracking compensation of the original input image as discussed above.

Figure 3:
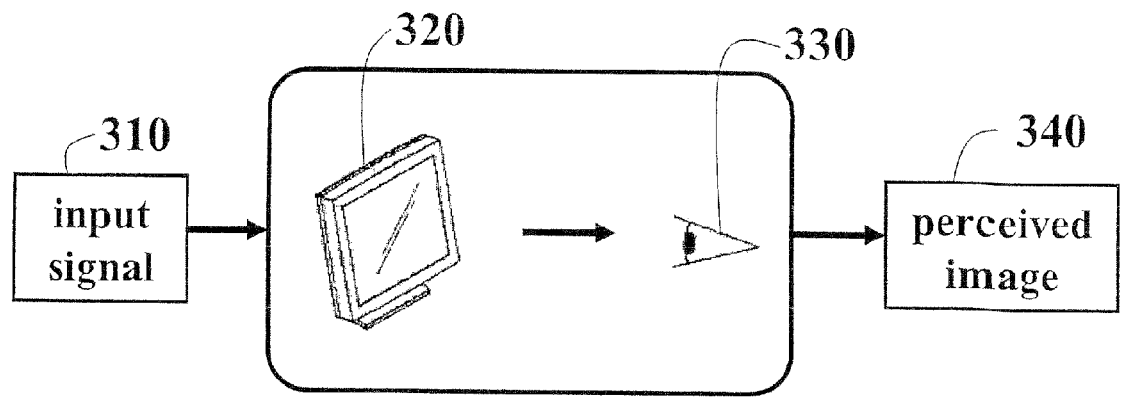
FIG. 3 illustrates the effect of uncompensated eye tracking characteristics on a user's perception of an image.

The lower drawing of FIG. 6-3 is similar to the lower drawings of FIGS. 6-1 and 6-2 showing how the human eye perceives a compensated image. Specifically, FIG. 6-3 shows perception of the apportioned frame period example (ETCF2) as compared to the non-apportioned example (ETCF) and uncompensated images (original blur). The different slopes for the ETCF2 plot indicate that there is an increase in luminance at two regions at two different rates. That is, as compared to the original blur, the ETCF2 image has a greater slope that corresponds with a faster increase of luminance, which indicates a reduction of image blur. Furthermore, the perceived image of ETCF2 exhibits less overshooting than the ETCF image and the original image. So as compared with the original output image, which is uncompensated, the ETCF2 image has a greater slope which indicates reduced image blur.

In another embodiment, the image resulting from eye tracking compensation of the original input image is displayed over the first half of a frame period and the original input image is displayed over the second half of the frame period. For example, referring to the upper and middle drawings of FIG. 6-4 input and output images are depicted. The output image includes a compensated image that is displayed over the first half of the frame period and the original (uncompensated) image that is displayed over the second half of the frame period. A graph of luminance (vertical axis) against pixel space (horizontal axis) is shown in the lower drawing of FIG. 6-4 for how the human eye perceives the compensated images of various embodiments. For example, in this example where the compensated signal is displayed over the first half of a frame period (ETCF3) there is an increase of luminance in two regions at different rates, indicated by different slopes. Compared to the image (original blur) perceived by the human eye of the original output signal, the ETCF3 image shows a greater slope corresponding to a faster increase of luminance, which indicates a reduction of image blur. Additionally, the perceived image of the ETCF3 signal manifests less overshooting than the perceived image of the ETCF signal. However, ETCF3 and ETCF2 differ in slope and the manifestation of overshooting. In practice, selection of a type of compensated output signal is made in light of the characteristics of a display device with a view to reducing overshooting or undershooting.

The eye tracking compensation of FIGS. 6-2 to 6-4 can be implemented using the eye tracking compensated system 500 depicted in FIG. 5. For example, the input circuit 510 may receive an input image signal Si; the motion vector detecting unit 520 may generate a motion vector corresponding to the input image signal Si; the eye-track simulating unit 530 may determine a compensation value $\{Si-[(Si+Si1+Si2+\ldots+Si(k-1))/k]\}$ according to the motion vector and the input image signal Si; and the compensating unit 540 may compensate the input image signal Si according to the compensation value so as to obtain an output signal $Si+\{Si-[(Si+Si1+Si2+\ldots+Si(k-1))/k]\}$ and send the output signal to a subsequent display device (not shown) for display.

The overshooting or undershooting of a compensated image signal perceived by the human eye may also be reduced in an embodiment that includes two filters. Referring to FIG. 6-5 a system is shown that includes two filters, filter A 610 and filter B 620. Filters A and B may be implemented as two equivalents to the eye tracking compensated system shown in FIG. 5. Filter A 610 and filter B 620 generate two compensated output signals 650 and 660 respectively and send these two compensated output signals to a display device 670. Generally, filter A 610 and filter B 620 receive an input signal Si 640 that is displayed on the liquid crystal display for a frame period unless the input signal is eye tracking compensated. The eye tracking compensated image signals SoA 650 and SoB 660 are sent to a multiplexer 630. The multiplexer 630 outputs the image signal SoA 650 over a portion of a frame period and the image signal SoB 660 over another portion of the frame period as appropriate. For instance, the multiplexer 630 may output the eye tracking compensated image signals SoA 650 and SoB 660 over the first half frame period and second half frame period respectively, thus allowing the liquid crystal display 670 to display images over the first half frame period according to the image signal SoA and over the second half frame period according to the image signal SoB.

Like other compensated output image signals, image signals SoA 650 and SoB 660 depend upon the magnitude of a motion vector. The magnitude of the motion vector is figured out by comparing the original image signal Si with a preceding image signal. For example, if the magnitude of the motion vector is a distance of 8 pixels in one frame period (e.g., a speed of 8 pixels/frame), the average compensation for SoA and SoB will range from 1 to 8 pixels. Taking 4 pixels as example, $$SoA(n)=Si(n)+\{Si(n)-[(Si(n)+Si(n-1)+Si(n-2)+Si(n-3))/4]\}*GainA$$

$$SoB(n)=Si(n)+\{[(Si(n)+Si(n+1)+Si(n+2)+Si(n+3))/4]-Si(n)\}*GainB$$

where luminance or the gray scale of pixels for the original input image is denoted by Si, pixel location by n, and adjustment coefficients by GainA and GainB. Adjustment coefficients GainA and GainB can be used to reduce overshooting or undershooting of eye tracking compensated images perceived by the human eye due to characteristics of the liquid crystal display.

The term $[Si(n)+Si(n-1)+Si(n-2)+Si(n-3)]/4$ used in the relationship between the image signal SoA(n) and the original image signal Si(n) expresses the average of the original image signal Si(n) and three resultant image signals Si(n-1), Si(n-2), and Si(n-3) that result from displacing the original image signal Si(n) in the same direction as the motion vector. The term $[Si(n)+Si(n+1)+Si(n+2)+Si(n+3)]/4$ used in the relationship between the image signal SoB(n) and the original input image signal Si(n) expresses the average of the original image signal Si(n) and three resultant image signals Si(n+1), Si(n+2), and Si(n+3) that result from displacing the original image signal Si(n) in the opposite direction of the motion vector.

Like So(n) of other embodiments, SoA(n) and SoB(n) may be adjusted according to the magnitude of the motion vector. For instance, the relationship between SoA (or SoB) and the original input image signal Si can be expressed as:

$$SoA=Si+\{[(Si+Sia1+Sia2+\ldots+Sia(ka-1))/ka]-Si\}*GainA$$

where ka denotes a positive integer greater than 2 that positively correlates with the magnitude of the motion vector. The resultant image signals resulting from different amounts of displacement of the first frame image signal Si in the same direction as the motion vector are expressed as Sia1, Si2, ..., Si(k-1). Furthermore, the relationship between SoB (or SoA) and the original input image signal Si can be expressed as:

$$SoB=Si+\{Si-[((Si+Sib1+Sib2+\ldots+Sib(kb-1))/kb)]\}*GainB$$

where kb denotes a positive integer greater than 2 that positively correlates with the magnitude of the motion vector. The resultant image signals resulting from different amounts of displacement of the first frame image signal Si in the opposite direction of the motion vector are expressed as Sib1, Sib, ..., Sib(kb-1).

In this example, the magnitude of ka and kb is set to half of the magnitude of the motion vector (8 pixels/frame), thus ka=kb=4 (pixels/frame). Sia1, Sia2, and Sia3 are expressed as Si(n-1), Si(n-2), and Si(n-3) respectively, denoting luminance of pixels for the resultant image signals resulting from displacing the image signal Si(n) by 1, 2, and 3 pixel units in the same direction as the motion vector. Sib1, Sib2, and Sib3 are expressed as Si(n+1), Si(n+2), and Si(n+3) respectively, denoting luminance of pixels for the resultant image signals resulting from displacing the image signal Si(n) by 1, 2, and 3 pixel units in the opposite direction of the motion vector. Consideration may be given to a display characteristic, and thus ka does not necessarily equal kb as appropriate.

Although two filters are shown in FIG. 6-5, more than two filters may be used to generate a wide variety of compensated image signals, and to allow a display device to display images according to the various compensated image signals over a frame period with a view to reducing motion blur caused by eye tracking characteristics.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method to compensate for eye tracking characteristics in a display device comprising pixels, comprising:

generating a motion vector according to a first frame image signal Si and a second frame image signal, the first frame image signal Si and the second frame image signal received as an input image signal, the second frame image signal received before the first frame image signal Si;

adjusting the pixel values of the first frame image signal Si according to a direction and magnitude of the motion vector, wherein adjusting the pixel values of the first frame image signal Si includes adjusting the pixel values of the first frame image signal Si according to the equation So=Si+(Si−Sc), wherein Sc is the average of the first frame image signal Si and one or more resultant image signals resulting from the incremental displacement of the first frame image signal Si in the same direction as the motion vector, wherein So is a third image signal; and displaying the third image signal So according to the adjusted pixel values.

2. The method of claim 1, wherein adjusting the pixel values of the first frame image signal Si according to the equation So=Si+(Si−Sc) further includes defining Sc as [Si+Si1+Si2+ . . . Si(k−1)]/k, k denoting a positive integer greater than 2 that positively correlates with the magnitude of the motion vector, and expressing the one or more resultant image signals resulting from the incremental displacement of the first frame image signal Si in the same direction as the motion vector as Si1, Si2, . . . , Si(k−1).

3. The method of claim 2, wherein displaying the third image signal So further includes displaying the first frame image signal Si over a first portion of a frame period and displaying the third image signal So over a second portion of the frame period.

4. The method of claim 3, wherein displaying the first frame image signal Si over a first portion of the frame period and displaying the third image signal So over a second portion of the frame period further includes displaying the first frame image signal Si over the first half of the frame period, and displaying the third image signal So over the second half of the frame period.

5. The method of claim 3, wherein displaying the first frame image signal Si over a first portion of the frame period and displaying the third image signal So over a second portion of the frame period further includes displaying the first frame image Si over the second half of the frame period, and displaying the third image signal So over the first half of the frame period.

6. The method of claim 1 wherein adjusting the pixel values of the first frame image signal Si further includes adjusting the pixel values of the first frame image signal Si according to the equation So=Si+(Si−Sc)*Gain, wherein Gain is a weight for adjusting the third image signal So to reduce motion blur caused by eye tracking characteristics.

7. The method of claim 6, wherein displaying the third image signal So further includes displaying the third image signal So over a portion of a frame period.

8. The method of claim 7, wherein displaying the third image signal So over a portion of the frame period further includes displaying the third image signal So over a second portion of the frame period.

9. The method of claim 1, wherein adjusting the pixel values of the first frame image signal Si further includes adjusting the pixel values of the first frame image signal Si according to the equation So=Si+(Si−Sc)*GainB, wherein GainB is a first weight for adjusting the third image signal So to reduce motion blur caused by eye tracking characteristics, wherein displaying the third image signal So includes displaying the third image signal So over a first portion of the frame period.

10. The method of claim 9, further comprising determining a fourth image signal SoA according to the direction and magnitude of the motion vector, wherein the fourth image signal SoA is determined according to the equation SoA=Si+(Sca−Si)*GainA, Sca denoting the average of the first frame image signal Si and one or more resultant image signals resulting from displacement of the first frame image signal Si in the opposite direction of the motion vector, GainA denoting a second weight for adjusting the fourth image signal SoA so as to reduce motion blur caused by eye tracking characteristics, and displaying the fourth image signal SoA over a first portion of the frame period and displaying the third image signal SoB over a second portion of the frame period.

11. The method of claim 10, wherein displaying the third SoB and fourth SoA image signals includes displaying the fourth image signal SoA over the first half of the frame period, and displaying the third image signal SoB over the second half of the frame period.

12. An eye tracking compensated circuit applied to a hold-type display and configured to reduce motion blur perceived by the eye, comprising:

an input unit to receive a first frame image signal Si and to buffer a second frame image signal that is received before the first frame image signal Si;

a motion vector detecting unit electrically connected to the input unit, the motion vector detecting unit to determine a motion vector according to the first frame image signal Si and the second frame image signal;

an eye-track simulating unit electrically connected to the motion vector detecting unit, the eye-track simulating unit to generate a compensation signal according to the motion vector and the first frame image signal Si, wherein the eye-track simulating unit is to generate the compensation signal according to the equation (Si−Sc), wherein Sc is the average of the first frame image signal Si and one or more resultant image signals resulting from displacement of the first frame image signal Si in a direction parallel to the motion vector, Sc defined as [Si+Si1+Si2+ . . . Si(k−1)]/k, k denoting a positive integer greater than 2 that positively correlates with the magnitude of the motion vector, and the one or more resultant image signals are expressed as Si1, Si2, . . . Si(k−1); and a compensating unit electrically connected to the input unit and the eye-track simulating unit, the compensating unit to generate an output image signal according to the first frame image signal Si and the compensation signal.

13. A hold-type display with an eye tracking compensated circuit, wherein the eye tracking compensated circuit reduces motion blur, which would otherwise be perceived by the eye to be occurring to a moving image displayed on the hold-type display, the hold-type display comprising:

an input unit to receive and to buffer an input image signal, the input image signal including a first frame image signal Si and a second frame image signal that is received and buffered before the first frame image signal;

a motion vector detecting unit, electrically connected to the input unit, to receive the first frame image signal Si and the second frame image signal and to determine a motion vector according to the first frame image signal and the second frame image signal;

an eye-track simulating unit, electrically connected to the motion vector detecting unit, to generate a compensation signal according to the motion vector and the first frame image signal Si, wherein the compensation signal is based, in part, on the average of the first frame image signal Si and one or more resultant image signals that result from the displacement of the first frame image signal Si in a direction parallel to the motion vector, wherein the eye-track simulating unit is to generate the compensation signal according to Si−Sc, where Sc=[Si+Si1+Si2+ . . . Si(k−1)]/k, k denoting a positive integer greater than 2 and positively correlating with the magnitude of the motion vector, and the one or more resultant image signals resulting from the displacement of the first frame image signal Si in the same direction as the motion vector are expressed as Si1, Si2 Si(k−1);

a compensating unit, electrically connected to the input unit and the eye-track simulating unit, to generate an output image signal So according to the input signal and the compensation signal; and a display unit, electrically connected to the compensating unit, to display an image according to the output image signal So.

14. The hold-type display of claim 13, wherein the input unit, motion vector detecting unit, eye track simulating unit, and compensating unit form a first filter unit to generate the output image signal SoA according to the first image signal, the output image signal SoA defined as SoA=Si+(Si−Sca)*GainA, Sca denoting the average of the first frame image signal Si and one or more resultant image signals resulting from the displacement of the first frame image signal Si in the same direction as the first motion vector, GainA denoting a first weight for adjusting the second image signal SoA to reduce motion blur caused by eye tracking characteristics, the hold-type display further comprising:

a second filter unit to receive the first image signal and to generate a second motion vector and another output image signal SoB according to the first image signal, the other output image signal SoB defined as SoB=Si+(Scb−Si)*GainB, Scb denoting the average of the first frame image signal Si and one or more resultant image signals resulting from the displacement of the first frame image signal Si in the opposite direction of the second motion vector, GainB denoting a second weight for adjusting the other output image signal SoB to reduce motion blur caused by eye tracking characteristics; and a multiplexer to receive the output image signal SoA and the other output image signal SoB, and to output the output image signal SoA over a first portion of a frame period, and to output the other output image signal SoB over a second portion of the frame period;

wherein the display unit is to receive the output image signal and the other output image signal from the multiplexer to display images according to the output image signals received.

15. The hold-type display of claim 14, wherein the first image signal received by the first filter unit and the second filter unit further comprises a second frame image signal received before the first frame image signal Si, and the first motion vector and the second motion vector are generated according to the first frame image signal and the second frame image signal.

16. The hold-type display claim 15, wherein the multiplexer is to receive the output image signal SoA and the other output image signal SoB, to output the output image signal SoA over the first half of the frame period and to output the other output image signal SoB over the second half of the frame period.

* * * * *